United States Patent [19]
Arai

[11] Patent Number: 5,355,861
[45] Date of Patent: Oct. 18, 1994

[54] EVAPORATIVE EMISSION CONTROL SYSTEM

[75] Inventor: Katsumi Arai, Ibaraki, Japan

[73] Assignee: Kyosan Denki Co., Ltd., Tokyo, Japan

[21] Appl. No.: 163,897

[22] Filed: Dec. 7, 1993

[51] Int. Cl.$^5$ .................. F02M 33/00; F02M 25/08
[52] U.S. Cl. ............................................ 123/519
[58] Field of Search .......... 123/510, 516, 518, 519, 123/520; 96/134, 135, 139

[56] References Cited

U.S. PATENT DOCUMENTS

| | | | |
|---|---|---|---|
| 3,942,499 | 3/1976 | Kunik et al. | 123/518 |
| 4,372,847 | 2/1983 | Lewis | 123/510 |
| 4,386,947 | 6/1983 | Mizuno et al. | 123/519 |
| 4,714,485 | 12/1987 | Covert et al. | 123/519 |
| 4,750,465 | 6/1988 | Rediker, Jr. et al. | 123/519 |
| 4,852,761 | 8/1989 | Turner et al. | 123/519 |
| 4,869,739 | 9/1989 | Kanome et al. | 123/519 |
| 4,951,643 | 8/1990 | Sato et al. | 123/520 |
| 5,119,791 | 6/1992 | Gifford et al. | 123/516 |
| 5,173,095 | 12/1992 | Yasukawa et al. | 123/519 |
| 5,207,808 | 5/1993 | Haruta et al. | 96/139 |

FOREIGN PATENT DOCUMENTS 63-104659 7/1988 Japan .
1-131858 9/1989 Japan .

Primary Examiner—E. Rollins Cross
Assistant Examiner—Thomas N. Moulis
Attorney, Agent, or Firm—Flynn, Thiel, Boutell & Tanis

[57] ABSTRACT

An evaporative emission control system provided with a vapor-liquid separation chamber in which a liquefaction accelerating agent is filled for forcibly liquefying and separating the high boiling ingredient contained in evaporative emission and vaporizing the liquid fuel effectively when the evaporative emission is purged, thereby lightening the burden imposed on the adsorbents and preventing the deterioration of the adsorbents so as to make the canister small while keeping the adsorbent properties. It comprises a vapor-liquid separation chamber formed in the canister, a liquefaction accelerating agent which is fibrous or long strip-shaped and filled in the upper portion of the vapor-liquid separation chamber, a fuel storage chamber disposed at the lower portion of the vapor-liquid separation chamber for storing the separated liquid fuel and an adsorbent accommodating chamber which communicates with the vapor-liquid separation chamber.

7 Claims, 6 Drawing Sheets

EVAPORATIVE EMISSION CONTROL SYSTEM

BACKGROUND OF THE INVENTION

1. Field of the Invention

The present invention relates to an evaporative emission control system for adsorbing fuel evaporated from a fuel tank, etc. (hereinafter referred to as an evaporative emission) of a vehicle such as a car and preventing the evaporative emission from being emitted to the atmosphere.

2. Prior Art

It is conventionally well known that the evaporative emission generated in the fuel tank, etc., of a vehicle such as a car is once adsorbed by an activated carbon in a canister so as to prevent it from being emitted in the atmosphere while the air is introduced into the canister by negative pressure generated in the engine of the car during the traveling of the car to thereby desorb the evaporative emission which was adsorbed by the activated carbon so that the desorbed or purged evaporative emission is supplied into the engine by way of an intake pipe and combusted in the engine.

However, in the tendency of a recent interest in a world wide level of an earth environmental problem, restriction for preventing the fuel evaporative emission generated in the vehicle from being emitted into the atmosphere is further imposed. Under the circumstances, the canister needs to have a sufficient adsorbing and desorbing properties for catching a large amount of evaporative emission generated in the car as the restriction is further imposed. To meet the need, merely the capacity of an adsorbent must be increased in the structure of the prior art canister, which results in making the canister inevitably large. It is difficult to mount such a large canister on the car. There are required such factors as the performance of the canister, namely, first is such an adsorbing performance that the adsorbent can adsorb the evaporative emission as much as possible, second is such a recycling performance that the adsorbent which adsorbed much evaporative emission can be recycled as much as possible. However, the adsorbent which has been currently used now can not desorb all the ingredients of the evaporative emission while it adsorbs and desorbs the evaporative emission repeatedly so that it accumulates the non-desorbed ingredients in its porosities, which results in the lowering of the canister performance. The adsorbents can be filled in the canister as much as possible taking into account the lowering of the canister performance, which makes the canister large.

If the amount of ingredients of the evaporative emission which is not desorbed and remained on the adsorbents (hereinafter referred to as remaining amount) can be reduced as much as possible, the amount of adsorbents to be filled in the canister can be reduced, which makes the canister small. As factors which influence the remaining amount, there are amount of vapor generated in the vehicle, ingredients of the evaporative emission which varies depending on the adsorbent properties and amount of air when the evaporative emission is purged. Aiming to the ingredients of the evaporative emission of these factors, the low boiling ingredient of the evaporative emission can be relatively easily desorbed even if it is adsorbed by the adsorbents but the high boiling ingredient is difficult to be desorbed, hence remains on the adsorbents. Furthermore, if a liquid fuel is stuck to the adsorbents, the adsorbents are soon deteriorated. To prevent the adsorbents from being deteriorated, it is proposed to provide a vapor-liquid separator as disclosed, for example, in Japanese Laid-Open Utility Model Publication No. 63-104659 and No. 1-131858 in which the high boiling ingredient is liquefied upstream the adsorbents and only the low boiling ingredient is adsorbed by the adsorbents.

In this proposal, since vapor-liquid separation is performed by a mere bending of fluid, the fuel can be separated into liquid particles to same extent but the high boiling ingredient in the evaporative gas can not be sufficiently separated and liquefied. Since the separated liquid fuel is evaporated by a heater or returned to a fuel tank, there are required additional heating apparatus and thermal energies and additional piping for returning the liquid fuel to the fuel tank.

SUMMARY OF THE INVENTION

The present invention has been made in view of the problems as set forth above and it has an object to provide an evaporative emission control system provided with a vapor-liquid separation chamber in which a liquefaction accelerating agent is filled for forcibly liquefying and separating the high boiling ingredient contained in evaporative emission and vaporizing the liquid fuel effectively when the evaporative emission is purged, thereby lightening the burden imposed on the adsorbents and preventing the deterioration of the adsorbents so as to make the canister small while keeping the adsorbent properties.

To achieve the above object, the evaporative emission control system of the invention comprises a vapor-liquid separation chamber formed in a canister, a liquefaction accelerating agent which is fibrous or long strip-shaped and filled in the upper portion of the vapor-liquid separation chamber, a fuel storage chamber disposed at the lower portion of the vapor-liquid separation chamber for storing the separated liquid fuel and an adsorbent accommodating chamber which communicates with the vapor-liquid separation chamber.

The evaporative emission control system according to another aspect of the invention comprises a vapor-liquid separation chamber formed in a canister, a liquefaction acceleration chamber disposed at the upper portion of the vapor-liquid separation chamber, a fuel storage chamber disposed at the lower portion of the vapor-liquid separation chamber, evaporation accelerating agents filled in the fuel storage chamber for drawing liquid fuel in the fuel storage chamber by capillarity and an adsorbent accommodating chamber which communicates with the vapor-liquid separation chamber.

The evaporative emission control system according to a further aspect of the invention comprises a vapor-liquid separation chamber in a canister, a liquefaction acceleration chamber disposed at the upper portion of the vapor-liquid separation chamber, a fuel storage chamber disposed at the lower portion of the vapor-liquid separation chamber, a tank inner pressure control valve having a discharge port and a purge valve having an inflow port which are respectively disposed at the upper end portion of the vapor-liquid separation chamber wherein the discharge port and the inflow port are adjacent to each other and an adsorbent accommodating chamber which communicates with the vapor-liquid separation chamber.

With such an arrangement of the invention, the evaporative emission generated in the fuel tank is introduced into the vapor-liquid separation chamber by way of an evaporation fuel pipe. The liquid particles contained in the evaporative emission is caught and separated by the liquefaction accelerating agent filled in the vapor-liquid separation chamber and the high boiling ingredient in the evaporative emission is cooled and liquefied and they are respectively stored in the fuel storage chamber of the vapor-liquid chamber. In such a manner, the evaporative emission from which the liquid particles and the high boiling ingredient are removed is adsorbed by the adsorbents in the canister.

When a purge valve is open at an appropriate time during the running of the engine, the atmosphere enters the canister whereby the evaporative emission adsorbed by the adsorbents is desorbed and is accompanied by the atmosphere and supplied to the intake pipe side of the engine due to the negative pressure generated in the engine by way of the vapor-liquid separation chamber. The evaporation accelerating agents vaporize the liquid fuel extensively which is drawn up from the fuel storage chamber by the capillarity while the atmosphere passes the evaporation accelerating agents in the vapor-liquid separation chamber.

In case that the tank inner pressure control valve is open when the purge valve is open, the evaporative emission from the fuel tank is not adsorbed by the adsorbents in the canister since the discharge port of the control valve and the inflow port of the purge valve are adjacent to each other but it is supplied to the intake pipe side by way of the control valve, the upper end portion of the vapor-liquid separation chamber and the purge valve, which results in lightening the burden of the canister.

DETAILED DESCRIPTION OF THE INVENTION

Figure 1:
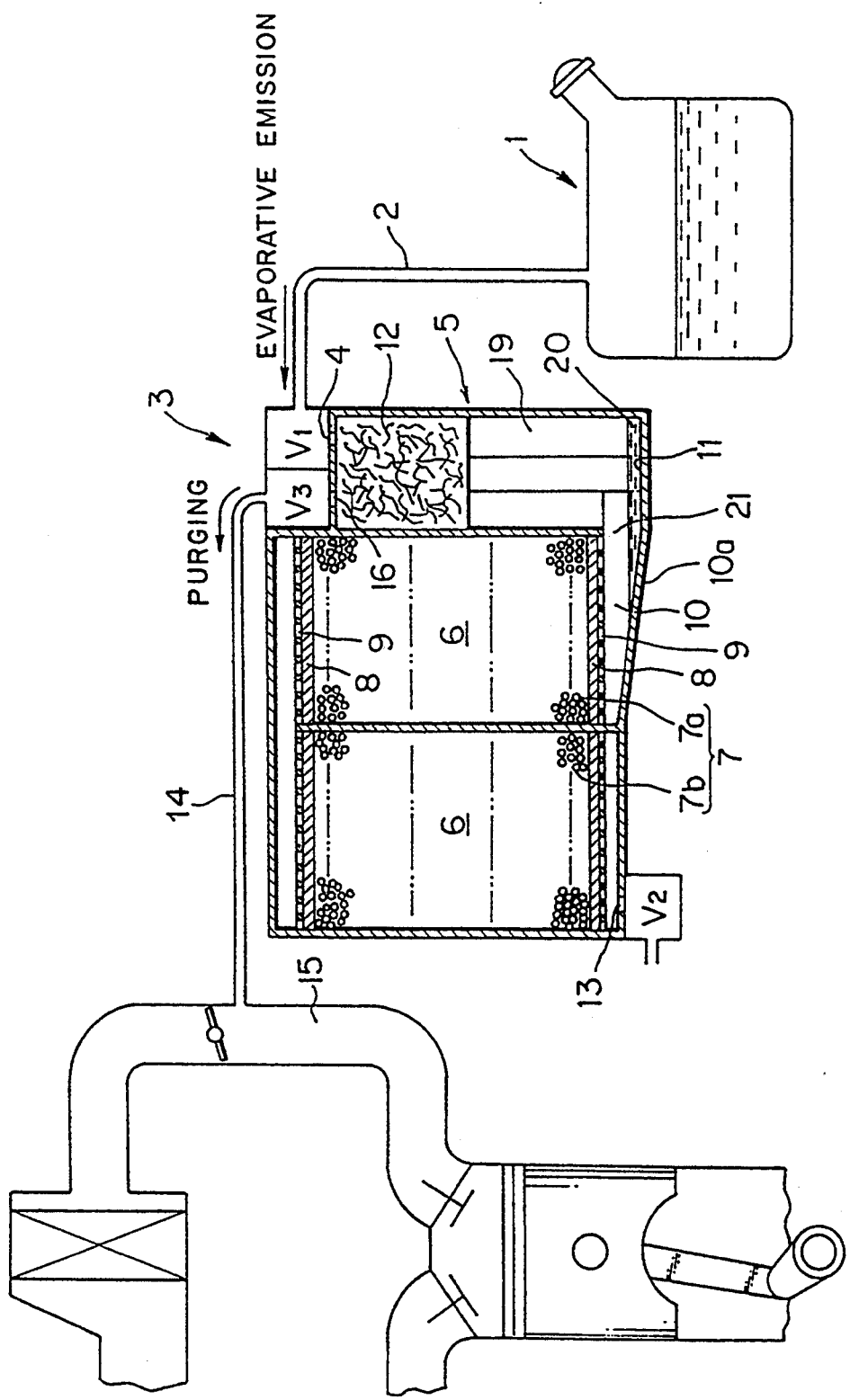
FIG. 1 is a view showing the arrangement of an evaporative emission control system according to a preferred embodiment of the invention.
Figure 2:
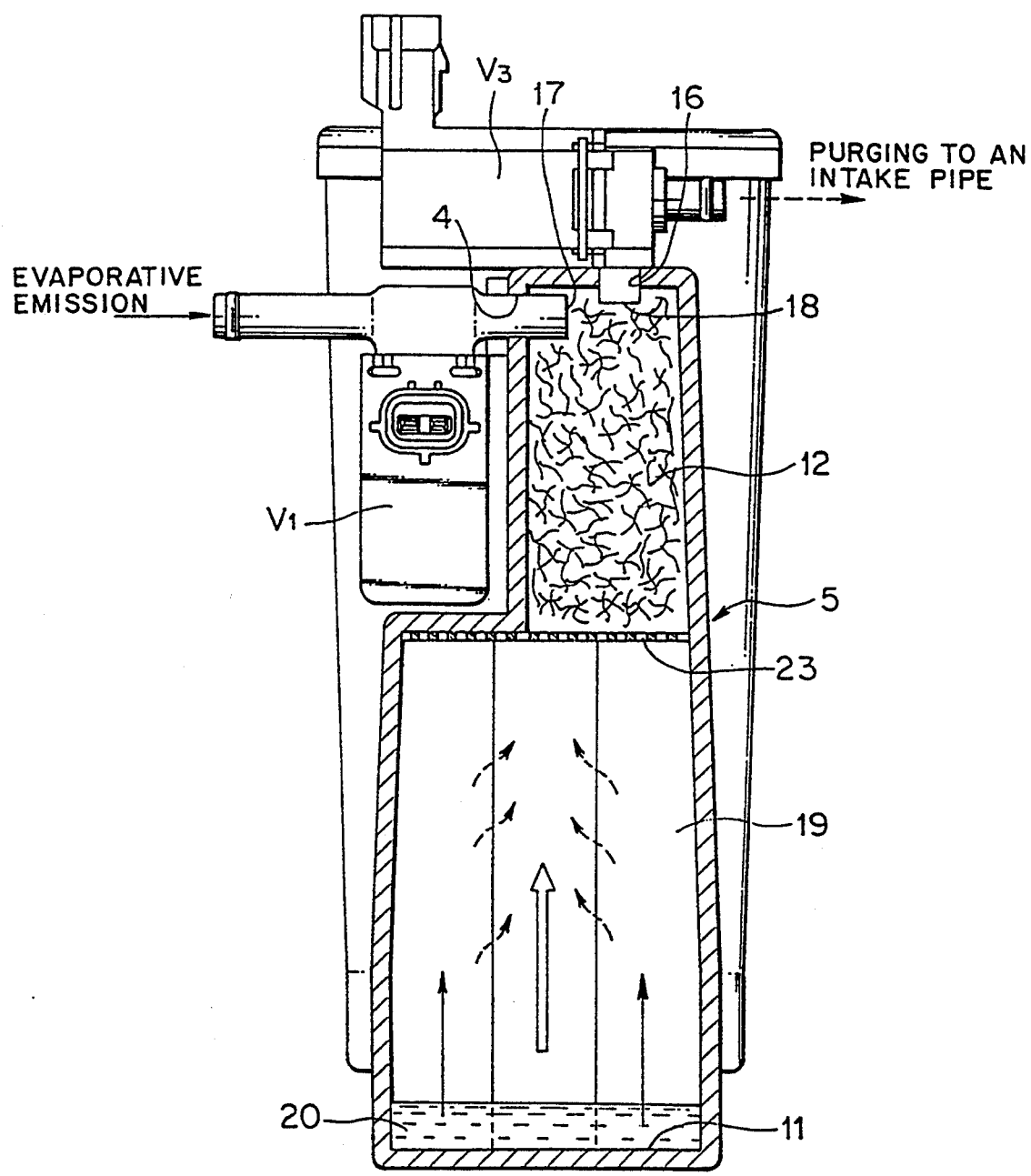
FIG. 2 is a view showing the arrangement of a vapor-liquid separation chamber of the evaporative emission control system of FIG. 1.

FIG. 1 is an overall arrangement of an evaporative emission control system according to a preferred embodiment and FIG. 2 is a detailed view of a vapor-liquid separation chamber.

An evaporative emission in a vapor or gaseous phase portion of a gasoline fuel tank I mounted on a car passes an evaporation fuel pipe 2 and it is introduced into a vapor-liquid separation chamber 5 formed in a canister 3 by way of an introduction port 4 of the canister 3. There is provided a tank inner pressure control valve V1 between the evaporation fuel pipe 2 and the introduction port 4 for controlling the tank inner pressure during the stop or the running of an engine. There is provided an adsorbent accommodating chamber 6 in the canister 3 and adsorbents 7 comprising an activated carbon, etc. are layered and accommodated in the adsorbent accommodating chamber 6. Denoted at 8 and 9 are a filter and a plate having apertures therein which respectively hold both ends of the layers of the adsorbents. An introduction chamber 10 is formed under the first adsorbent layer 7a for introducing the evaporative emission into the adsorbent accommodating chamber 6 through the introduction chamber 10. The introduction chamber 10 is open to a liquid fuel storage chamber (hereinafter referred to simply as storage chamber) 11 of the vapor-liquid separation chamber 5. The liquid fuel which is separated by a liquefaction accelerating agent 12 which is filled in the upper portion of the vapor-liquid separation chamber 5 and the liquid fuel which is liquefied by the liquefaction accelerating agent 12 are respectively stored in the storage chamber 11 under the vapor-liquid separation chamber 5 and the evaporative emission alone is introduced into the adsorbent accommodating chamber 6 through the introduction chamber 10. A wall 10a disposed at the lower end of the first adsorbent layer 7a is inclined so as to return a part of the liquid fuel, which is apt to be accompanied by the evaporative emission into the adsorbent accommodating chamber 6, to the storage chamber 11. The last adsorbent layer 7b in the adsorbent accommodating chamber 6 communicates with the atmosphere by way of an atmosphere port 13 and a vent valve (solenoid valve) V2. The vent valve V2 is always open but is closable at the energizing time when an evaporation system is diagnosed to have troubled.

The vapor-liquid separation chamber 5 communicates with an intake pipe 15 of the engine by way of a purge pipe 14 and there is interposed a purge valve V3 between a purge port 16 defined at the upper end portion of the vapor-liquid separation chamber 5 and the purge pipe 14. The purge valve V3 controls an amount of fuel purge to the intake pipe 15. The tank inner pressure control valve V1, the vent valve V2 and the purge valve V3 are respectively disposed in the canister 3. A discharge port 17 of the tank inner pressure control valve V1 projects from the introduction port 4 into the vapor-liquid separation chamber 5 while an inlet port 18 of the purge valve V3 projects from the purge port 16 into the vapor-liquid separation chamber 5 wherein the discharge port 17 and the inlet port 18 are disposed adjacent to each other in the vapor-liquid separation chamber 5 at the upper end portion thereof.

Figure 3:
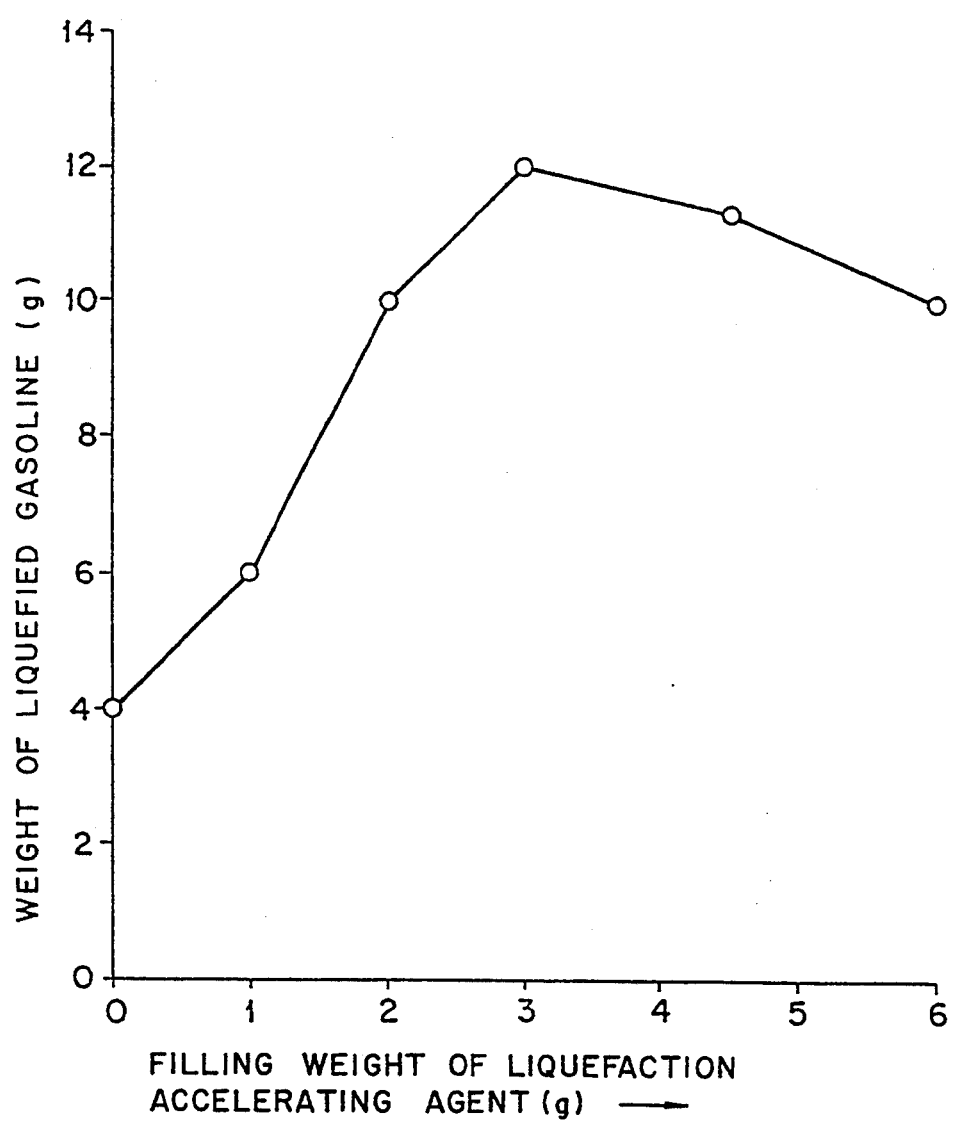
FIG. 3 is a graph showing the relation between the filling weight of a liquefaction accelerating agent and the weight of liquefied gasoline.

The liquefaction accelerating agent 12 to be mounted at the upper portion of the vapor-liquid separation chamber 5 is made of metal such as a stainless steel, aluminum, etc., or a resin material which is desirable to be fibrous or long strip-shaped for catching liquid particles contained in the evaporative emission and cooling the high boiling ingredient contained in the evaporative emission so that liquid particles and the high boiling ingredient can be liquefied. The liquefaction accelerating agent made of these materials is experimented and the liquefaction accelerating effect is confirmed in the graph of FIG. 3 which shows the relation between a filling weight of a liquefaction accelerating agent and a weight of liquefied gasoline. It is noted from FIG. 3 that the weight of the liquefied gasoline increases as the amount of the liquefaction accelerating agent to be filled in the vapor-liquid separation chamber 5 (hereinafter referred to as a filling amount of the liquefaction accelerating agent) is increased. The liquefaction accelerating agent has a very effective liquefaction at some filling amount thereof because the liquefaction accelerating agents overlap each other at such filling amount so that the surface areas thereof connecting the evaporative emission are reduced. Accordingly, the filling amount of the liquefaction accelerating agent having an excellent liquefaction efficiency may be determined with reference to FIG. 3.

In case that the liquefaction accelerating agent 12 is mounted on the vapor-liquid separation chamber 5, the evaporative emission which is desorbed from the adsorbents at the purge time strikes against the liquefaction accelerating agent 12 whereby the evaporative emission is liable to be liquefied again. However, even if the evaporative emission is liquefied again at the purge time, i.e. during the running of the engine, it is soon evaporated by a purge air and is introduced into the intake pipe 15, which does not cause any problem.

Figure 4:
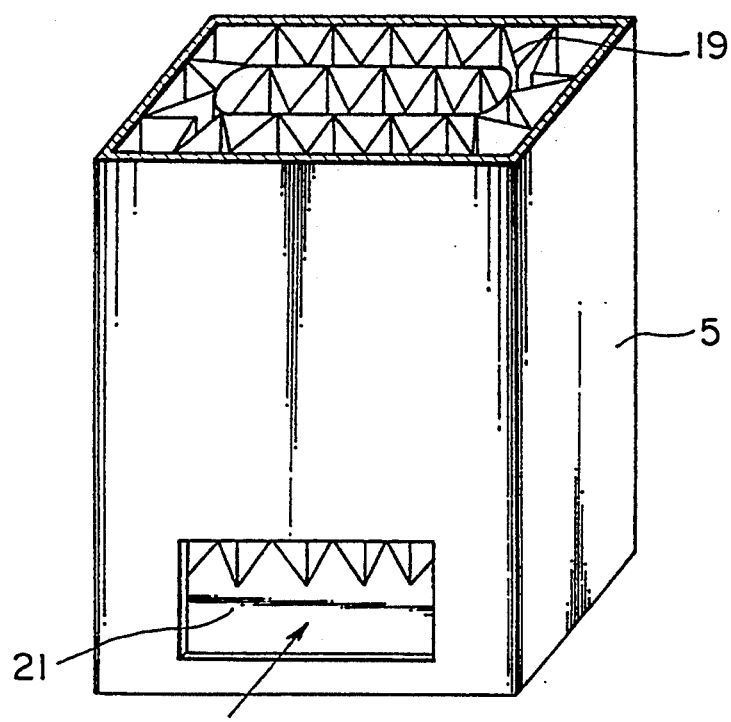
FIG. 4 is a view showing the arrangement of evaporation accelerating agents used in the evaporative emission control system according to the preferred embodiment of the invention.
Figure 5:
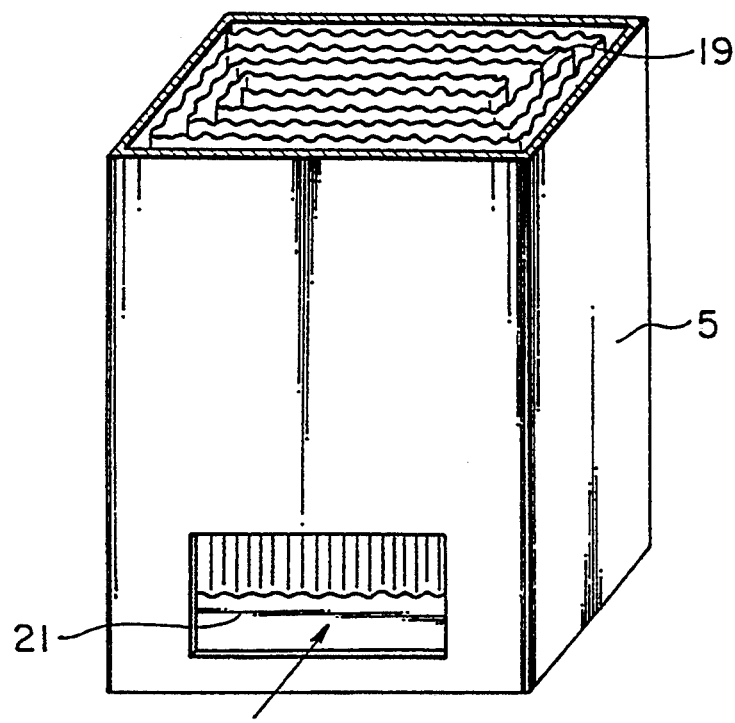
FIG. 5 is a view showing the arrangement of evaporation accelerating agents according to a modification of the invention.
Figure 6:
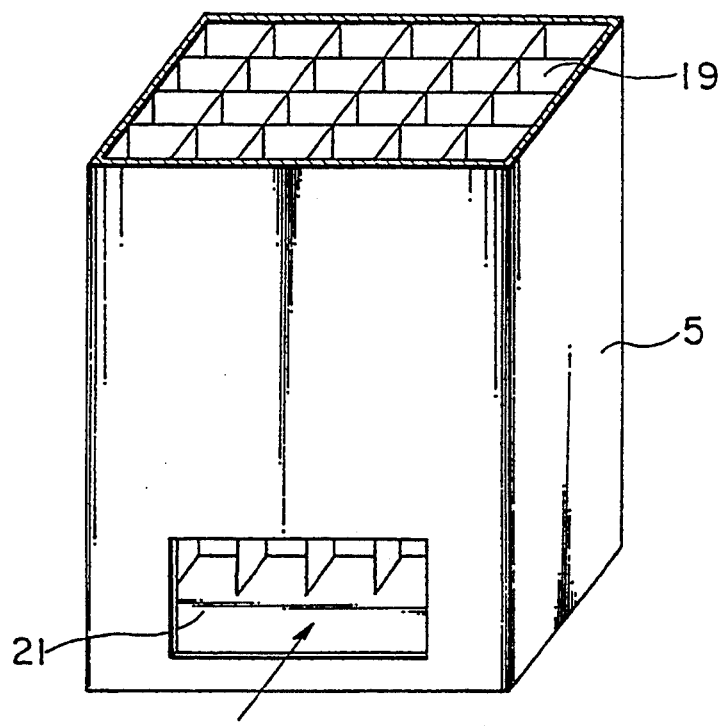
FIG. 6 is a view showing the arrangement of evaporation accelerating agents according to a modification of the invention.
Figure 7:
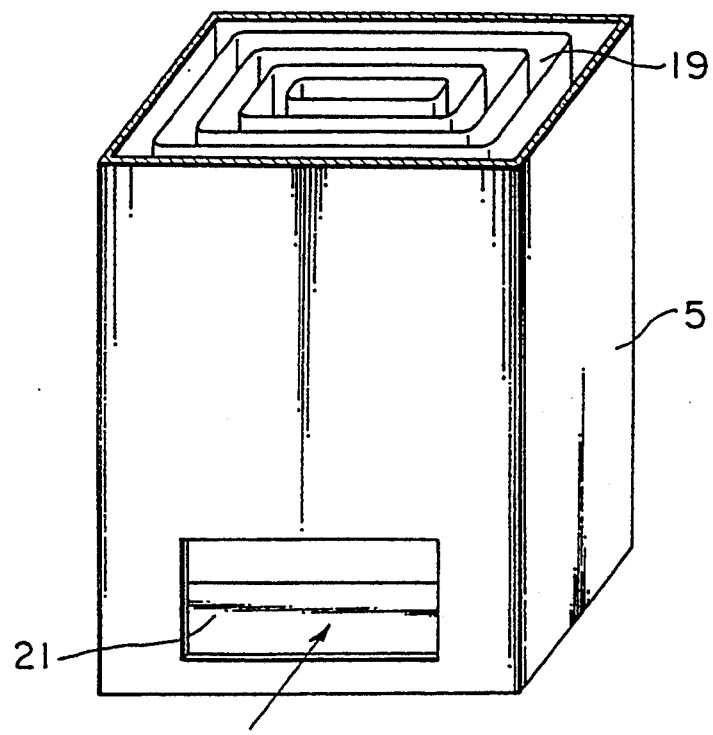
FIG. 7 is a view showing the arrangement of evaporation accelerating agents according to a further modification of the invention.
Figure 8:
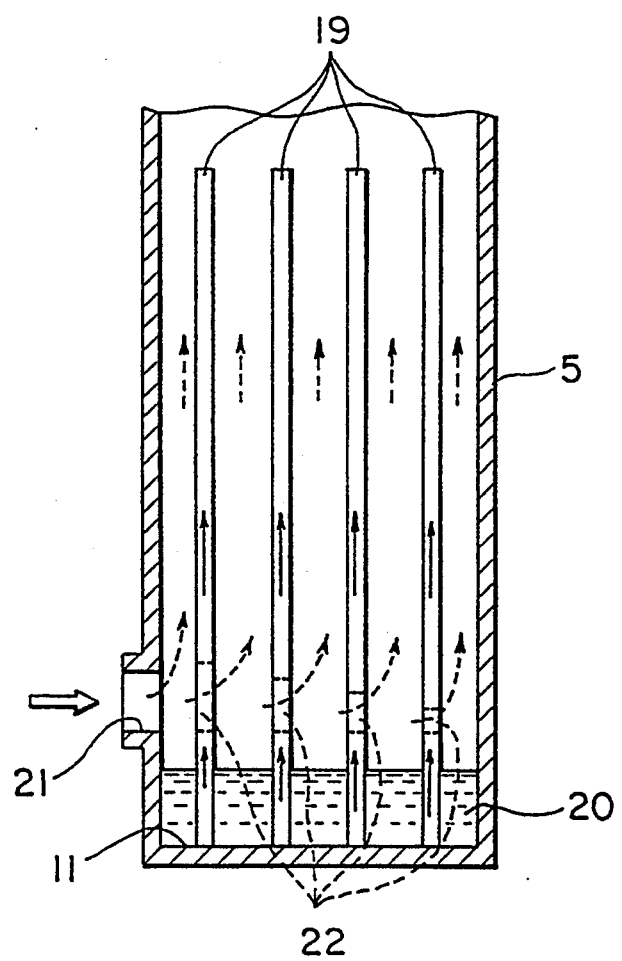
FIG. 8 is a view showing the arrangement of evaporation accelerating agents according to a still further modification of the invention.

Evaporation accelerating agents 19 are mounted in the storage chamber 11 under the vapor-liquid separation chamber 5. Each of the evaporation accelerating agent 19 is made of a material capable of drawing up liquid fuel 20 stored in the storage chamber 11 by the capillarity. Such material comprises for example iron, resins, cotton, etc. which are woven like screen as the fibrous material or a non-woven cloth mixed with the fiber. A filter to be used in a filter paper for filtering fuel is also effective as such material. The material of each evaporation accelerating agent has a shape like pleats formed by bending it as illustrated in FIG. 4, a spiral shape as shown in FIG. 5, a lattice shape as shown in FIG. 6 or a cylindrical shape as shown in FIG. 7. These evaporation accelerating agents 19 may be mounted respectively in the lower portion of the vapor-liquid separation chamber 5. The vapor-liquid separation chamber 5 has an opening 21 defined at the lower portion thereof for communicating with the introduction chamber 10 and vent holes 22 are defined at the middle lower portions of each evaporation accelerating agent 19 so as to traverse these evaporation accelerating agents 19. It is desirable that these vent holes 22 are arranged in the manner that they are gradually smaller in the cross sectional areas as they are farther from the opening 21 so that the atmosphere spreads uniformly over the entire surfaces of the evaporation accelerating agents 19.

The liquefaction accelerating agent 12 to be mounted on the upper portion of the vapor-liquid separation chamber 5 are needed to be held from the lower portion thereof so that it is not fallen down. If the liquefaction accelerating agent 12 is held by the upper ends of the evaporation accelerating agents 19 to be mounted on the lower portion of the vapor-liquid separation chamber 5, the former can be easily held by the latter. At this time, if there is any possibility that the liquefaction accelerating agent 12 enters between the evaporation accelerating agents 19, apertures 23 may be provided at the boundary portion between the liquefaction accelerating agent 12 and the evaporation accelerating agents 19.

In the evaporative emission control system having such a structure as set forth above, if the pressure in the fuel tank 1 is increased by the evaporative emission generated in the fuel tank 1 during the stop of the engine, the control valve V1 is open and the evaporative emission in the fuel tank 1 enters the vapor-liquid separation chamber 5 by way of the evaporation fuel pipe 2, the valve V1 and the discharge port 17. The liquid particles contained in the evaporative emission is caught and separated by the liquefaction accelerating agent 12 filled in the upper portion of the vapor-liquid separation chamber 5 and the high boiling ingredient in the evaporative emission is cooled and liquefied by the liquefaction accelerating agent 12 so that the liquid particles and the high boiling ingredient are stored in the storage chamber 11. The evaporative emission from which the liquid particles and the high boiling ingredient are removed is introduced into the introduction chamber 10 through the opening 21 and then adsorbed by the adsorbents 7.

When the engine runs and the purge valve V3 is open at an appropriate time, the atmosphere enters the canister from the atmosphere port 13 due to the negative pressure negative pressure generated in the intake pipe 15 side of the engine so that the evaporative emission which is adsorbed by the adsorbents 7 is desorbed or purged and the desorbed evaporative emission is accompanied by the atmosphere and passes the vapor-liquid separation chamber 5, the purge valve V3 and the purge pipe 14 and is then supplied to the intake pipe 15 and finally it is combusted in the engine.

The evaporation accelerating agents 19 evaporate the liquid fuel which is drawn up from the storage chamber 11 by the capillarity during the time when the atmosphere enters from the opening 21 into the vapor-liquid separation chamber 5 and passes the evaporation accelerating agents 19. At that time, if the vent holes 22 are arranged in the manner that they are gradually smaller in the cross-sectional areas as they are farther from the opening 21, the atmosphere spreads uniformly over the entire surfaces of the evaporation accelerating agents 19 whereby the evaporation is more accelerated.

In case that the control valve V1 is open when the purge valve V3 is open, the evaporative emission from the fuel tank 1 is not adsorbed by the adsorbents 7 in the canister since the discharge port 17 of the control valve V1 and the inflow port 18 of the purge valve V3 are adjacent to each other but it passes the control valve V1, the upper end portion of the vapor-liquid separation chamber 5, the purge valve V3 and the purge pipe 14 then enters the intake pipe 15, which results in lightening the burden of the canister.

Since the evaporative emission control system of the present invention comprises the vapor-liquid separation chamber at the upper portion of which the fibrous or long-stripped liquefaction accelerating agent is filled, the storage chamber disposed at the lower portion of the vapor-liquid separation chamber for storing the separated liquid fuel, and the adsorbent accommodating chamber in the canister communicating with the vapor-liquid separation chamber, the liquid particles contained in the evaporative emission are caught and separated and the high boiling ingredient in the evaporative emission is cooled and liquefied by the liquefaction accelerating agent and stored in the storage chamber, the evaporative emission to be adsorbed by the adsorbents in the canister does not include the high boiling ingredient whereby the evaporative emission can be easily desorbed when the evaporative emission is purged and the deterioration of the adsorbents can be prevented, which makes the canister small.

Furthermore, since the evaporative emission control system comprises the liquefaction acceleration chamber disposed at the upper portion of the vapor-liquid separation chamber and the fuel storage chamber disposed at the lower portion of the vapor-liquid separation chamber wherein the evaporation accelerating agents are filled in the fuel storage chamber for drawing up liquid fuel in the fuel storage chamber by capillarity and the adsorbent accommodating chamber communicates with the vapor-liquid separation chamber, the evaporation accelerating agents can easily evaporate the liquid fuel which is drawn up extensively from the storage chamber by the capillarity when the atmosphere passes the liquefaction accelerating agent in the vapor-liquid separation chamber, which entirely dispenses with the heat energies for evaporation.

Since the fibrous or long-stripped liquefaction accelerating agent is filled in the liquefaction accelerating chamber and the liquefaction accelerating agent is held by the upper ends of the evaporation accelerating agents, the former can be easily held at the vapor-liquid separation chamber.

Since the vent holds are defined in each evaporation accelerating agent, the atmosphere spreads over the evaporation accelerating agents through the vent holes and also since the cross-sectional areas of the vent holes are smaller as the vent holes are farther from the opening 21, the atmosphere spreads all the surfaces of the evaporation accelerating agents uniformly, which accelerates the evaporation.

Since the discharge port of the control valve and the inflow port of the purge valve are adjacent to each other, the evaporative emission in the fuel tank is not adsorbed by the adsorbent in the canister but it is directly supplied to the intake pipe side of the engine by way of the control valve, the upper end portion of the vapor-liquid separation chamber 5, the purge valve and the purge pipe.

What is claimed is:

1. In an evaporative emission control system including a canister having an adsorbent accommodating chamber for accommodating an adsorbent therein, said canister being disposed in an evaporation emission passage for connecting between a fuel tank side and an intake pipe side of an engine, wherein an evaporative emission is adsorbed by the adsorbent so as to prevent the evaporative emission from being emitted to the atmosphere during a stop of the engine while the evaporative emission is desorbed from the adsorbent by the introduction of the atmosphere into the canister due to negative pressure generated in the engine and the desorbed evaporated emission is supplied to the intake pipe side of the engine and combusted in the engine while the engine is running, comprising the improvement wherein said evaporative emission control system further includes:

a vapor-liquid separation chamber formed in said canister;

a liquefaction accelerating agent which is fibrous or long strip-shaped and filled in an upper portion of said vapor-liquid separation chamber;

a fuel storage chamber disposed in a lower portion of said vapor-liquid separation chamber for storing a separated liquid fuel; and said vapor-liquid separation chamber communicating with said adsorbent accommodating chamber.

2. In an evaporative emission control system including a canister having an adsorbent accommodating chamber for accommodating an adsorbent therein, said canister being disposed in an evaporation emission passage for connecting between a fuel tank side and an intake pipe side of an engine, wherein an evaporative emission is adsorbed by the adsorbent so as to prevent the evaporative emission from being emitted to the atmosphere during a stop of the engine while the evaporative emission is desorbed from the adsorbent by the introduction of the atmosphere into the canister due to negative pressure generated in the engine and the desorbed evaporated emission is supplied to the intake pipe side of the engine and combusted in the engine while the engine is running, comprising the improvement wherein said evaporative emission control system further includes;

a vapor-liquid separation chamber formed in said canister;

a liquefaction acceleration chamber disposed in an upper portion of said vapor-liquid separation chamber;

a fuel storage chamber disposed in a lower portion of said vapor-liquid separation chamber;

evaporation accelerating agents filled in the fuel storage chamber for drawing liquid fuel into the fuel storage chamber by capillarity; and said vapor-liquid separation chamber communicating with said adsorbent accommodating chamber.

3. An evaporative emission control system according to claim 2, wherein a fibrous or long strip-shaped liquefaction accelerating agent is disposed in said liquefaction acceleration chamber, and wherein said liquefaction accelerating agent is held by upper ends of the evaporation accelerating agents.

4. An evaporative emission control system according to claim 2, wherein each of the evaporation accelerating agents is formed of a filter member.

5. An evaporative emission control system according to claim 2, wherein each of the evaporation accelerating agents have vent holes at a middle portion thereof wherein the vent holes are arranged to traverse the evaporation accelerating agents.

6. An evaporative emission control system according to claim 5, wherein the vent holes are arranged in the manner that they are gradually smaller in cross-sectional areas as they are disposed farther from an opening communicating with the canister.

7. In an evaporative emission control system including a canister having an adsorbent accommodating chamber for accommodating an adsorbent therein, said canister being disposed in an evaporation emission passage for connecting between a fuel tank side and an intake pipe side of an engine, wherein an evaporative emission is adsorbed by the adsorbent so as to prevent the evaporative emission from being emitted to the atmosphere during a stop of the engine while the evaporative emission is desorbed from the adsorbent by the introduction of the atmosphere into the canister due to negative pressure generated in the engine and the desorbed evaporated emission is supplied to the intake pipe side of the engine and combusted in the engine while the engine is running, comprising the improvement wherein said evaporative emission control system further includes:
- a vapor-liquid separation chamber formed in said canister;
- a liquefaction acceleration chamber disposed in an upper portion of said vapor-liquid separation chamber;
- a fuel storage chamber disposed in a lower portion of said vapor-liquid separation chamber;
- a tank inner pressure control valve having a discharge port, and a purge valve having an inflow port which are respectively disposed at the upper end portion of the vapor-liquid separation chamber wherein the discharge port and the inflow port are adjacent to each other; and the adsorbent accommodating chamber communicates with the vapor-liquid separation chamber.

* * * * *